United States Patent

Simons

[15] 3,681,417

[45] Aug. 1, 1972

[54] PREPARATION OF SILVER KETENIDES

[72] Inventor: Michael John Simons, Wealdstone, England

[73] Assignee: Eastman Kodak Company, Rochester, N.Y.

[22] Filed: Aug. 13, 1970

[21] Appl. No.: 63,658

[30] Foreign Application Priority Data

Feb. 6, 1970 Great Britain.................5,768/70

[52] U.S. Cl..................................................260/430
[51] Int. Cl...................................................C07f 1/10
[58] Field of Search......................................260/430

[56] References Cited

UNITED STATES PATENTS 2,924,614   2/1960   Reuter........................260/429.3

FOREIGN PATENTS OR APPLICATIONS 616,319   1/1949   Great Britain.................260/430

OTHER PUBLICATIONS

Blues et al. Discussions of the Faraday Society Vol. 47 pp. 190– 198 (1969)
Chemical Abstracts, Vol. 56 Pg. 12920d (1962)

*Primary Examiner*—Tobias E. Levow
*Assistant Examiner*—H. M. S. Sneed
*Attorney*—William H. J. Kline, Bernard D. Wiese and Gerald E. Battist

[57] ABSTRACT

Silver ketenide complexes useful as liquid-phase oxidation catalysts and having the empirical formula $Ag_2C_2O$ are prepared by reacting a silver compound such as silver nitrate, silver formate, silver acetate, silver propionate, silver sulfate, silver trifluoroacetate, silver benzoate and silver tetrafluoroborate with ketene in the presence of an inert atmosphere. A basic condensation catalyst such as a tertiary amine may be employed where advantageous. The reaction preferably is carried about at a temperature between about 18° C. to about 140° C.

11 Claims, No Drawings

PREPARATION OF SILVER KETENIDES

This invention relates to silver compounds, and more particularly to the preparation of silver ketenides.

New complexes of silver known as silver ketenides have recently been prepared by a method described by E. T. Blues and D. Bryce-Smith in *Discussions of the Faraday Society*, Vol. 47, pp. 190–198 (1969). These complexes, believed to be of the empirical formula $Ag_2C_2O$, were prepared by heating various silver salts with acetic anhydride, sometimes in the presence of a tertiary amine basic catalyst. The silver ketenides are remarkable in that they appear to contain silver in an oxidation state less than +1, can be antiferromagnetic, can undergo photooxidation by oxygen and can photochemically fix molecular nitrogen. In addition, they have utility as liquid-phase oxidation catalysts.

The method of Blues and Bryce-Smith employs acetic anhydride which can be made commercially by the reaction of ketene with acetic acid. Large excesses of the anhydride must be used, often at reflux temperatures in excess of 120° C., in the silver complexing reaction to overcome the inhibiting effects of the acetic acid by-product formed. It would thus be advantageous to avoid the use of acetic anhydride to produce the desired silver ketenide complexes and to provide a simple, economical method for producing silver ketenides.

Accordingly, the present invention relates to a new method for the preparation of certain silver ketenide complexes. According to a method of the present invention, silver ketenides are prepared by reacting a silver compound with ketene, a compound having the formula $CH_2 = C = O$, in the presence of an inert atmosphere. As ketene is a gas at room temperature, silver ketenide complexes may be formed according to the method of the present invention in situ from a suitable silver compound supported on a solid substrate, as well as from silver compounds dissolved in common organic solvents. Basic tertiary amine condensing catalysts such as pyridine, triethylamine, N,N-dimethylformamide and the like may be advantageously employed where desirable and in many cases can also serve as the solvent for the silver compound to be reacted with ketene.

Silver compounds suitable for use in the present invention include silver nitrate, silver formate, silver acetate, silver propionate, silver benzoate, silver sulfate, silver trifluoroacetate and silver tetrafluoroborate. Other silver compounds may also be used, their suitability being determined by the presence of a characteristic red or yellow color developing upon reaction with ketene according to the method of the present invention. If used in solution, the silver compound employed in carrying out the method of the present invention can vary widely in concentration, ranging from about 0.01 molar to about 10.0 molar solution.

The reaction of ketene with the silver compounds is preferably carried out at temperatures of about 18° C. to about 140° C.; however, it can be varied depending upon the compound used, its concentration, and whether it is in solid form or solution during reaction.

In carrying out the method of the present invention, ketene is typically prepared by pyrolysis of acetone in a ketene generator similar to that described on page 372 of A. I. Vogel's *A Textbook of Practical Organic Chemistry*, 3rd Ed., Longman, Green and Company Ltd., London, 1957. Such a generator produces roughly equimolar amounts of methane and ketene at a rate of about 0.075 mole/hour, the effluent gas containing methane, ketene, and some acetone. The ketene so produced is employed in this form, without purification, when carrying out the method of the present invention, though pure ketene may, of course, also be used.

Generally, air is purged from the ketene generator before use to prevent the formation of an explosive mixture of acetone vapor and air during ketene generation. Similarly, the reaction space is generally purged of air when carrying out the method of the present invention to avoid a combustion-supporting atmosphere in view of the explosive instability of some of the silver ketenide complexes. Inert gases such as argon or nitrogen may be present in the reaction space or ketene generator in lieu of vacuum. For purposes of the present invention, "inert atmosphere" is understood to include vacuum conditions.

The following examples more fully describe the method of the present invention. It should be noted that many of the silver ketenide silver complexes are explosively unstable when rapidly heated above about 150° C., when struck, when exposed to an intense light flash or when treated with concentrated hydrochloric acid, and thus should be treated with caution by the experimenter.

EXAMPLE 1

Silver trifluoroacetate (50 g., 0.023 mole) is dissolved in benzene (100 ml.). Air is purged from the reaction chamber and the solution maintained at room temperature. Gas from a ketene generator (about 0.025 mole ketene) is passed through the solution for 20 minutes. The solution immediately turns yellow, and then a yellow precipitate forms. The resulting yellow solid is filtered off, washed with benzene and dried, yielding 2.9 g. of yellow solid containing approximately 0.023 gram-atoms of silver.

Measurement of the X-ray diffraction pattern of a sample of this yellow solid shows that it is identical to a sample of a silver complex which had been previously made for purposes of comparison from silver acetate, acetic anhydride and triethylamine according to the method of Blues and Bryce-Smith referred to above, i.e., by adding a solution of silver acetate (0.1 mole) in triethylamine (0.5 mole) to acetic anhydride (1.0 mole) under argon at 20° C.

The infrared-absorption spectrum of another sample of this yellow solid is measured over the range 4,000–400 $cm^{-1}$ and prominent absorption peaks are found to occur at 1,980, 635 and 410 $cm.^{-1}$. Identical peaks are found when the infrared absorption spectrum of a sample of the complex made according to the Blues and Bryce-Smith method is measured.

EXAMPLE 2

Ketene is passed according to the method of Example 1 through a solution of silver nitrate (1.0 g.) in dimethylformamide (20 ml.). A red solid forms, which is filtered off and washed with dimethylformamide. Washing causes the solid to turn yellow in color. After drying, the yellow solid is found to give an X-ray powder diffraction pattern identical to that of the yellow solid obtained in Example 1.

EXAMPLE 3

Ketene is passed according to the method of Example 1 over solid silver benzoate. A change of color to bright yellow is observed. The solid is washed in an aqueous ammonia solution to dissolve unchanged silver benzoate, then washed in very dilute acetic acid and dried. The yellow product again produces the same X-ray powder diffraction pattern as does the yellow solid obtained in Example 1.

EXAMPLE 4

A. Silver acetate (2.0 g.) is dissolved in pyridine (20 ml.), and ketene is bubbled through the solution for 10 minutes. The resulting yellow solid is filtered off, washed with pyridine and dried. The product is shown by X-ray powder diffraction and infrared spectroscopy to be identical to a sample of a silver complex which was made for purposes of comparison from a suspension/solution of silver oxide in pyridine and acetic anhydride according to the method described by Blues and Bryce-Smith and referred to above. The infrared absorption spectrum shows prominent absorption peaks at 2,060, 2,010, 1,590, 1,063, 994, 732, 700, 635, 606 and 420 cm.$^{-1}$.

B. The portion of the comparative silver complex is treated with 5 percent aqueous acetic acid to remove pyridine, as described by Blues and Bryce-Smith, and the X-ray powder diffraction pattern of the resulting solid is measured.

The yellow solid of the present example is heated at 80° C. for 1 hour to remove pyridine. The X-ray powder diffraction pattern of the yellow solid thus formed is measured and found to be identical to the solid formed by acetic acid treatment as just described.

C. The infrared-absorption spectra of both pyridine-free solids are measured and found to be similar, but not identical, to those of the solids obtained in Examples 1, 2 and 3. Chemical properties, such as reaction with dilute hydrochloric acid to give silver chloride and acetic acid and with hydrogen chloride gas diluted with nitrogen to give silver chloride, ketene and acetyl chloride, are similar for the pyridine-free solids of this example and the solids obtained in Examples 1, 2 and 3.

EXAMPLE 5

Silver benzoate (1.0 g.) is dissolved in pyridine (7 ml.) and the solution is boiled under reflux. Ketene is passed through the refluxing solution for 10 minutes; the mixture is cooled and the yellow solid which forms is filtered off, washed with ethanol and dried.

The X-ray powder diffraction pattern of this yellow solid is measured and found to be identical with that of the sample of the silver complex which was made for purposes of comparison as described in Example 4.

The yellow solid is heated at 80° C. for 1 hour to remove pyridine. The X-ray powder diffraction pattern of the resulting yellow solid is identical with that of the solid formed by acetic acid treatment in Example 4.

EXAMPLE 6

A 300 cc. stirred autoclave is charged with 50 cc. anhydrous benzene and 1.0 g. silver ketenide formed according to the method of Example 2. The autoclave is sealed and 15 g. propylene is added. The stirrer is started and the reactants heated to 175° C. Oxygen gas is then added in four 50-pound increments at 15-minute intervals. The maximum pressure attained during oxygen addition is then maintained for 1 hour by addition of oxygen as required. The autoclave is cooled and vented through a dry ice-isopropyl alcohol cold trap. The liquid contents of the autoclave are recovered by filtration from the residual silver catalyst and combined with the liquid in the cold trap. Vapor-phase chromatography of the liquid product reveals selectivity to propylene oxide is 66 percent.

EXAMPLE 7

The procedure of Example 6 is duplicated except that no silver ketenide is added. Selectivity of propylene oxidation to propylene oxide is only 54 percent.

Although the invention has been described in considerable detail with particular reference to certain preferred embodiments thereof, variations and modifications can be effected within the spirit and scope of the invention.

I claim:

1. A method of making silver ketenide which comprises reacting a silver compound with ketene in an inert atmosphere; said silver compound being selected from the group consisting of silver nitrate, silver formate, silver acetate, silver propionate, silver benzoate, silver sulfate, silver trifluoro-acetate and silver tetrafluoroborate.

2. A method of making silver ketenide according to claim 1 wherein the reaction of said silver compound with said ketene is carried out at a temperature between about 18° C. to about 140° C.

3. A method according to claim 2 wherein the silver compound employed is silver acetate.

4. A method according to claim 2 wherein the silver compound employed is silver benzoate.

5. A method according to claim 2 wherein the silver compound employed is silver nitrate.

6. A method according to claim 2 wherein the silver compound employed is silver trifluoroacetate.

7. A method of making silver ketenide which comprises reacting a silver compound selected from the group consisting of silver nitrate, silver propionate, silver formate, silver acetate, silver benzoate, silver sulfate, silver trifluoroacetate and silver tetrafluoroborate with ketene in an inert atmosphere at a temperature between about 18° C. to about 140° C. in the presence of a tertiary amine condensation catalyst.

8. A method according to claim 7 wherein the silver compound employed is silver acetate.

9. A method according to claim 7 wherein the silver compound employed is silver benzoate.

10. A method according to claim 7 wherein the silver compound employed is silver nitrate.

11. A method according to claim 7 wherein the silver compound employed is silver trifluoroacetate.

* * * * *